United States Patent [19]
Riehm

[11] Patent Number: 5,647,682
[45] Date of Patent: Jul. 15, 1997

[54] FRAME WITH AT LEAST TWO HOLLOW BARS EXTENDING AT RIGHT ANGLES TO ONE ANOTHER

[75] Inventor: Thomas Riehm, Ebnat-Kappel, Switzerland

[73] Assignee: Geberit Technik AG, Jona, Switzerland

[21] Appl. No.: 400,618

[22] Filed: Mar. 8, 1995

[30] Foreign Application Priority Data

Mar. 28, 1994 [CH] Switzerland ................. 927/94

[51] Int. Cl.$^6$ .................................................. F16B 7/04
[52] U.S. Cl. ................... 403/297; 403/231; 403/257; 403/409.1
[58] Field of Search .............................. 403/231, 256, 403/257, 263, 264, 297, 322, 405.1, 409.1

[56] References Cited

U.S. PATENT DOCUMENTS

| | | | |
|---|---|---|---|
| 3,574,367 | 4/1971 | Jankowski | 403/409.1 X |
| 3,811,785 | 5/1974 | Hagglund | 403/231 X |
| 4,345,849 | 8/1982 | Stenemann | 403/257 X |
| 4,572,694 | 2/1986 | Hoeksema | 403/405.1 X |
| 5,048,995 | 9/1991 | Beaulieu | 403/297 X |
| 5,269,619 | 12/1993 | Warkus et al. | 403/263 X |

FOREIGN PATENT DOCUMENTS

| | | | |
|---|---|---|---|
| 0493319 | 7/1992 | European Pat. Off. | F16B 7/04 |
| 2 454 551 | 4/1979 | France | F16B 2/18 |
| 2 530 937 | 7/1983 | France | A47B 47/00 |
| 2528921 | 12/1983 | France | 403/297 |
| 178018 | 12/1906 | Germany | 403/263 |
| WO9007652 | 7/1990 | WIPO | F16B 7/04 |
| WO9221887 | 12/1992 | WIPO | F16B 7/04 |

Primary Examiner—Blair Johnson
Assistant Examiner—Andrea Chop
Attorney, Agent, or Firm—McGlew & Tuttle

[57] ABSTRACT

The frame has at least two hollow bars extending at right angles to one another and at least one connector, which connects the two hollow bars to one another at a distance from one another. The connector has a locking body as well as an expanding means in which the locking body engages an undercut groove of one bar with a head part and a front-side hollow space of the other hollow bar with a foot end. The locking body has a clamp-shaped design. The expanding means has an eccentric bolt, which expands the two legs at right angles to their longitudinal direction between the two hollow bars, thereby detachably connecting a head end and a foot end of the locking body to the associated hollow bar by clamping.

19 Claims, 2 Drawing Sheets

FRAME WITH AT LEAST TWO HOLLOW BARS EXTENDING AT RIGHT ANGLES TO ONE ANOTHER

FIELD OF THE INVENTION

The present invention pertains to a frame with at least two hollow bars extending at right angles to one another and with at least one connector, which connects the two hollow bars at a distance from one another and has a locking body and an expanding means, in which the locking body engages an undercut groove of one of the bars with one head end and a front-side hollow space of the other hollow bar with a foot end.

BACKGROUND OF THE INVENTION

A frame of this class has been known from the Applicant's patent No. EP-A-0 493 319. This is especially suitable for the installation of plumbing units. It offers the special advantage that hollow bars cut to any desired length can be detachably connected to one another without any subsequent processing in a very simple manner and rapidly. The connectors provided in this frame have expanding means, which comprises two wedges mounted displaceably in a housing. These wedges are pushed against the ends of the connector and away from one another by rotating a rotary part arranged between them, and the foot end and the head end of the connector are maintained expanded as a result. The wedges and the rotary part have a relatively complicated design, and they require a relatively great distance between the foot end and the head end.

SUMMARY AND OBJECTS OF THE INVENTION

The primary object of the present invention is to provide a frame of the above-described class, which can be manufactured in a simpler manner and at a lower cost, and which can nevertheless be installed in a simple manner and reliably.

The object is attained according to the present invention in a frame of the above-described type by the locking body being designed as a clamp-like body and by the expanding means having an eccentric bolt, which expands the two legs of the clamp at right angles to its longitudinal direction between the two hollow bars, thereby detachably connecting the head end and the foot end of the locking body to the associated hollow bar by clamping. Wedges are not required for expanding the connector ends in such a frame, because the legs of the clamps are expanded directly with an eccentric bolt arranged between them.

The head ends of the connectors are fixed in the corresponding groove in an especially displacement-secured manner if a dog, which engages a profiled section of the groove in a positive-locking manner, is arranged on the eccentric bolt. According to a variant of the present invention, the two legs of the clamp have profiled sections, which engage corresponding profiled sections of the hollow bars in a positive-locking manner.

One essential advantage of the frame according to the present invention is considered to be the fact that the connection between adjacent hollow bars is substantially simpler than in the prior-art frame. The distance between adjacent bars may be essentially equal to the diameter of the eccentric bolt and it can consequently be shorter than before.

According to the invention, a frame is provided comprising two hollow bars arranged extending at right angles to one another and at least one connector for connecting the two hollow bars at a distance from one another. The connector includes a locking body as well as an expanding means. The connector engages an undercut groove of one of the bars with a head end of the locking body and engages a front-side hollow space of the other hollow bar with a foot-end of the locking body. The locking body is designed as a clamp. The expanding means has an eccentric bolt which expands two legs of the locking body, at right angles to their longitudinal direction between the two hollow bars. This allows a detachable connection of the head end and the foot end of the locking body to the associated hollow bar by clamping.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
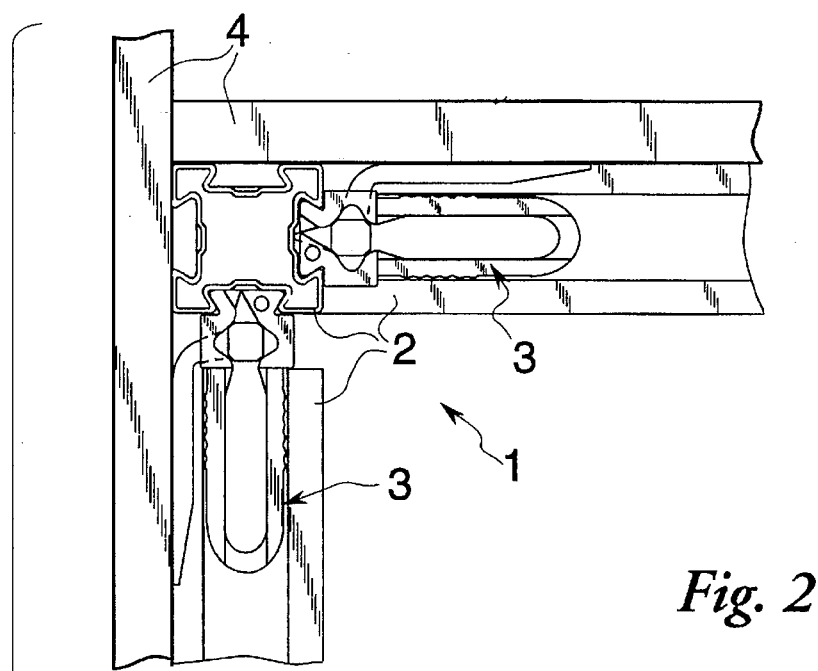
FIG. 1 is a sectional view of a frame according to the present invention.
Figure 1:
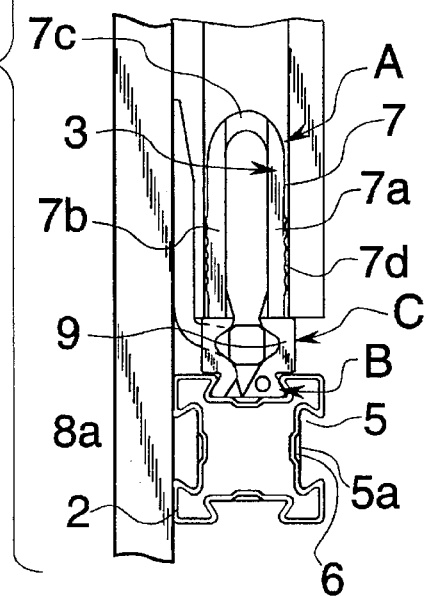

FIG. 1 shows a plurality of hollow bars 2 (known per se), which are detachably connected to connectors 3 to form a frame, which may be covered with plates. Installed parts, not shown, e.g., fitting plates, may be arranged on the frame. The frame 1 usually rests on the floor of a building and is used as a support, e.g., for plumbing units.

The hollow bars 2, made of, e.g., sheet metal, have a square cross section and four dovetail grooves 5 extending over their entire length. These grooves 5 are profiled on their groove bottom 5a, e.g., with flutes 6 extending at right angles to the longitudinal direction of the bar. These flutes 6 are prepared by embossing, so that corresponding ribs 6a are present in a hollow space 17. The hollow bars 2 are thus provided with profiled sections on the outside and on the inside. All bars 2 of the frame are preferably identical. However, different bars as well as additional support parts may obviously be used as well.

The connectors 3 are also preferably all of the same design.

Each of the connectors 3 has a foot end A, a head end B as well as an expanding means C. The foot end A is formed by two legs 7a and 7b elastically connected to one another via a web 7c. In the view according to FIG. 3, the foot end A is U-shaped. As is apparent especially from FIG. 2, the legs 7a and 7b are provided on the outside with flutes 7d, which are designed corresponding to the ribs 6a. The foot end A is dimensioned such that it can be placed over its entire length into a front-side hollow space 17 of a hollow bar 2 and can be removed therefrom without resistance. The foot end A is preferably dimensioned such that it can be introduced into the hollow space 17 without compressing the legs 7a and 7b.

The head end B has two locking cams 10a and 10b, which are separated from one another by an obliquely extending slot 10c. A plurality of teeth 10d, which are designed corresponding to the flutes 6, are formed on the front side of the locking cam 10b.

Figure 2:
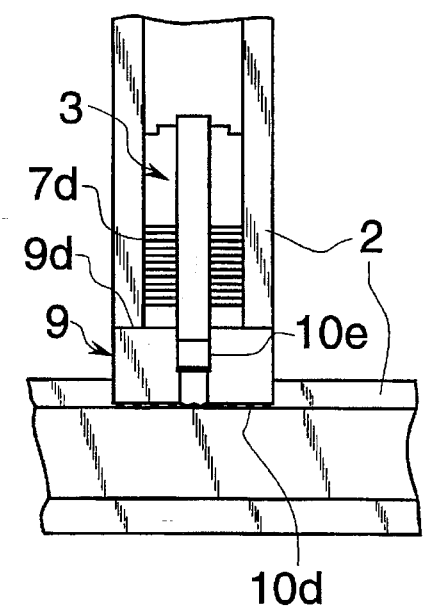
FIG. 2 is a partial view of the frame according to FIG. 1.
Figure 3:
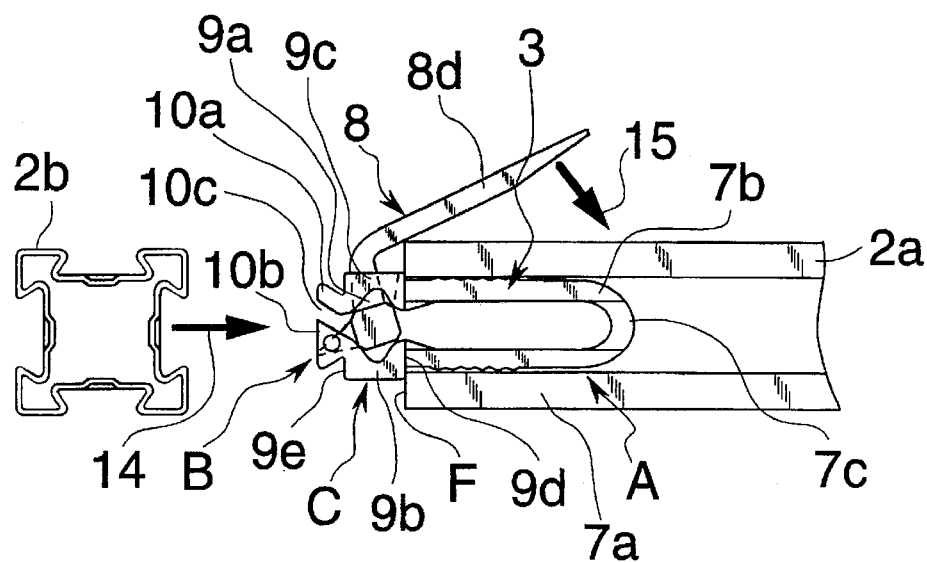
FIG. 3 is a schematic view showing the joining of a connector with two hollow bars extending at right angles to one another.

The expanding means C has an expanding block 9 comprising of two sections 9b and 9c of the legs 7a and 7b, which are likewise separated from one another, and between which a noncircular space 9a is arranged for accommodating an eccentric bolt 8a of an expanding element 8. The recess 9a is connected to the slot 10c. The eccentric bolt 8a can thus be detachably inserted into the recess 9a through the slot 10c by expanding the legs 7a and 7b. In addition, it can be rotated in the recess 9a by a lever 8d made in one piece with it. As is shown in FIGS. 2 and 3, the lever 8d extends to the outside through a slot 10e of the expanding block 9.

The eccentric bolt 8a has a noncircular, e.g., square cross section, as is shown in the drawing. The recess 9a is designed such that the legs 7a and 7b as well as the locking cams 10a and 10b are expanded to the maximum extent when the lever 8d is pivoted into a groove 5, as is shown in FIG. 1, and thus it extends in parallel to the adjacent hollow bar 2.

Figure 4:
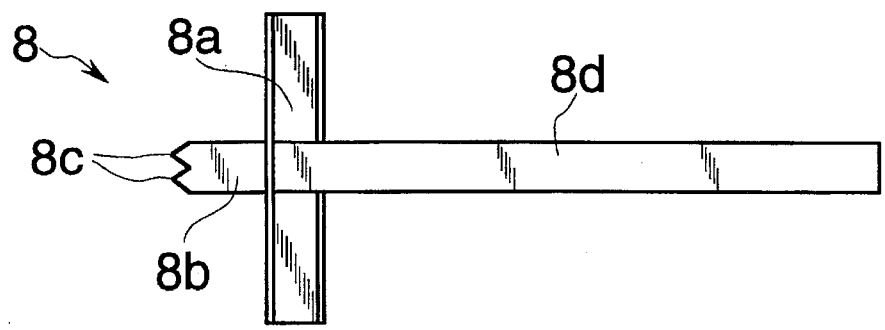
FIG. 4 is a view of an expanding element.
Figure 5:
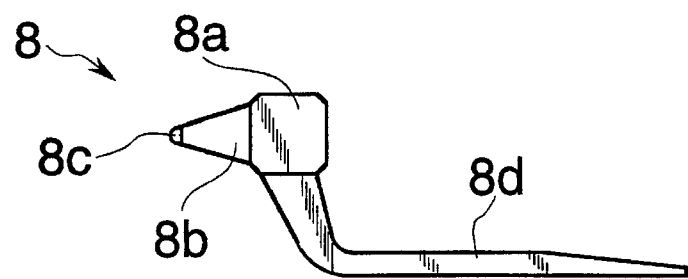
FIG. 5 is another view of the expanding element according to FIG. 4.

A dog 8b, which has at least two teeth 8c on its front side, is made in one piece with the eccentric bolt 8a. According to FIG. 4, the dog 8b is substantially narrower than the eccentric bolt 8a, and it extends through the slot 10e of the locking cam 10b to the front side of the locking body 7. The length of the dog 8b is great enough for the teeth 8c to project beyond the locking cam 10b on the front side with the lever 8d pivoted in and to lie aligned with the teeth 10d. With the lever 8d and the dog 8b, the eccentric bolt 8a forms a one-piece expanding element 8, which is preferably made of a suitable metal as a casting.

The connection of two bars 2a and 2b will be explained in greater detail below based especially on FIG. 3. To connect the bar 2a to the bar 2b extending at right angles thereto, a connector 3 is first inserted with the foot end A into a front-side hollow space 17 of the bar 2a, until a shoulder surface 9d of the expanding block 9 comes into contact with the front-side section surface F of the hollow bar 2a, as is shown in FIG. 3. The connector 3 can be inserted into the hollow space 17 in each of the four possible rotation positions in terms of its longitudinal axis. The lever 8d is also pivoted out as shown. The section bar 2b is now placed on the head end B of the connector 3 in the direction of arrow 14, until the hollow bar comes into flat contact with a front-side shoulder 9e of the expanding block 9. The end of bar 2a is thus spaced from the side of bar 2b by a connection distance equal to the distance between shoulders 9e and 9b as shown in the Figures. The locking cams 10a and 10b are then completely recessed in a groove 5, and the teeth 10d made in one piece engage flutes 6 on the bottom 5a of the groove. The lever 8 is subsequently pivoted in the direction of arrow 15 until it is recessed in a groove 5 and does not project to the side. The legs 7a and 7b as well as the locking cams 10a and 10b are expanded during this rotary movement, and they are tensioned in the process against the inside of the hollow space 17 and of the groove 5, respectively. The dog 8b is pivoted at the same time with the lever 8d, and the teeth 8c are aligned with the teeth 10d. The expanding bolt 8a is now in the position shown at several locations in FIG. 1. The counterpressure of the sections 9a and 9c loads, symmetrically distributed, the four edges of the expanding bolt 8a. This cannot therefore rotate by itself even under a high counterpressure.

In the joined state, the connector 3 is thus connected at its foot end A to the hollow bar 2a by the profiled sections on the inside of the hollow bar 2a and on the outside of the legs 7a and 7b in a positive-locking manner. There is also a positive-locking connection between the hollow bar 2b and the head end B through the teeth 10d of the locking body 7 and the teeth 8c of the expanding element 8. The locking body 7 thus forms a clamp, which firmly connects the two hollow bars 2a and 2b to one another. It is essential, in particular, for the foot end A not to be able to be pulled out in the longitudinal direction of the hollow bar 7a even under a strong force, and for the head end B also not to be displaceable correspondingly in the longitudinal direction of the hollow bar 2b. The foot end A and, at the same time, the head end B can be detached from the respective hollow bar 2a and 2b by pivoting out the lever 8d. In the detached state, e.g., the hollow bar 2b can be displaced in the longitudinal direction. When the lever 8d is pivoted back into a groove 5, the hollow bars 2a and 2b are again immediately firmly connected to one another. Detaching and connecting can thus be performed without a tool in a very simple manner and rapidly. The frame can thus be installed without an auxiliary tool. If the frame is covered by plates 4, the levers 8d are fixed by these plates 4 in the pivoted-in position, and the connections are thus secured.

Besides the considerable advantages of the frame according to the present invention, the frame can be prepared, as is shown, with a very small number of components, which are simple and sturdy, so that a frame is obtained according to the present invention which not only excellently meets the plumbing technical requirements, but is also inexpensive because of its simplicity of preparation and its robust design and is extremely reliable in operation.

While a specific embodiment of the invention has been shown and described in detail to illustrate the application of the principles of the invention, it will be understood that the invention may be embodied otherwise without departing from such principles.

What is claimed is:

1. A frame comprising:

a first elongated hollow bar including an outer surface and an outer undercut groove recessed within said outer surface and a second elongated hollow bar having an end surface perpendicular to the longitudinal axis of said second hollow bar and including an outer undercut groove;

connector means for connecting said first hollow bar to said second hollow bar at a right angle with respect to said second hollow bar and with said end surface of said second hallow bar being spaced a connection distance away from said outer surface of said first hollow bar, said connector means including a locking body with a head end connectable with said undercut groove of said first hollow bar and a foot end connectable to a front-side hollow space of said second hollow bar, said foot end including two legs, said locking body forming a clamp, said connector means further including pivotable expanding means pivotable about an axis parallel to the longitudinal axis of said first hollow bar and being positioned in said connection distance and for directly expanding said head end to engage said undercut groove of said first hollow bar and for directly expanding said legs at right angles to a longitudinal direction to cause an outer side of said legs to positively lock with said second hollow bar, thereby allowing detachable connection of said head end of said locking body to said first hollow bar and allowing detachable connection of said foot end of said locking body to said second hollow bar.

2. A frame according to claim 1, wherein said two legs of said foot end extend in parallel, connected at an end by a U-shaped portion.

3. A frame according to claim 1, wherein at least one of said two legs includes a profiled section on an outside and an interior of said hollow space includes a corresponding profiled section.

4. A frame according to claim 1, wherein said expanding means includes an expanding block disposed between said foot end and said head end and including an eccentric bolt mounted rotatably in said expanding block, said expanding block being formed of sections of said two legs.

5. A frame according to claim 4, wherein said expanding block includes two shoulders extending at right angles to the longitudinal direction of said legs, said shoulders being spaced said connection distance from one another and each of said shoulders having a surface for contact with one of said hollow bars.

6. A frame according to claim 5, wherein said distance essentially corresponds to a diameter of said eccentric bolt.

7. A frame according to claim 4, wherein said eccentric bolt includes a dog which extends at least up to a front side of said head end to form said clamp for engaging said undercut groove of said first hollow bar to fix said connector means.

8. A frame according to claim 7, wherein said dog has projections which engage a profiled section of said undercut groove of said first hollow bar in a positive-locking manner.

9. A frame according to claim 7, wherein said dog is formed in one piece with said eccentric bolt.

10. A frame according to claim 4, further comprising a lever for actuating said expanding means, said lever being pivoted into a groove of said second hollow bar, said lever being arranged on said eccentric bolt.

11. A frame according to claim 10, wherein said lever is formed in one piece with said eccentric bolt.

12. A frame according to claim 4, wherein said eccentric bolt includes a polygonal cross-section.

13. A frame according to claim 12, wherein said polygonal cross-section is a rectangular cross-section.

14. A frame according to claim 13, wherein said locking body clamp includes a non-circular recess with a boundary surface in contact with said eccentric bolt over a plurality of symmetrically distributed surfaces.

15. A frame according to claim 14, wherein said recess is open toward said head end with a slot in said head end and said eccentric bolt is introduced into said recess through said slot.

16. A frame according to claim 4, wherein said eccentric bolt has essentially a square cross-section.

17. A connector according to claim 1, wherein said expanding means comprises an eccentric bolt with a lever formed in one piece and with a dog formed in one piece with said eccentric bolt.

18. A frame comprising:

a first elongated hollow bar including an outer surface and an outer undercut groove recessed within said outer surface and a second elongated hollow bar having an end surface perpendicular to the longitudinal axis of said second hollow bar and including an outer undercut groove;

connector means for connecting said first hollow bar to said second hollow bar at a right angle with respect to said second hollow bar and with said end surface of said second hollow bar being spaced a connection distance away from said outer surface of said first hollow bar, said connector means including a locking body with a head end connectable with said undercut groove of said first hollow bar and a foot end connectable to a front-side hollow space of said second hollow bar, said foot end including two legs, said connector means further including a single expanding means pivotable about an axis parallel to the longitudinal axis of said first hollow bar for directly expanding said head end to engage said undercut groove of said first hollow bar and for directly expanding said legs at right angles to a longitudinal direction to cause an outer side of said legs to positively lock with an inside of said second hollow bar.

19. A frame according to claim 18, wherein:

said head end is spaced from said foot end by said connection distance;

said expanding means is positioned between said head end and said foot end;

said expanding means simultaneously expands said head end and said foot end to positively lock said first and second hollow bars together.

* * * * *